(12) United States Patent
Jo et al.

(10) Patent No.: US 11,879,718 B2
(45) Date of Patent: Jan. 23, 2024

(54) EDGE EXTRACTION METHOD AND EDGE EXTRACTION DEVICE

(71) Applicant: Nippon Telegraph and Telephone Corporation, Tokyo (JP)

(72) Inventors: Teruo Jo, Tokyo (JP); Hiroshi Hamada, Tokyo (JP); Hideyuki Nosaka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 300 days.

(21) Appl. No.: 17/608,955

(22) PCT Filed: May 21, 2019

(86) PCT No.: PCT/JP2019/020102
§ 371 (c)(1),
(2) Date: Nov. 4, 2021

(87) PCT Pub. No.: WO2020/234996
PCT Pub. Date: Nov. 26, 2020

(65) Prior Publication Data
US 2022/0214160 A1 Jul. 7, 2022

(51) Int. Cl.
*G01B 11/24* (2006.01)
*G01B 15/04* (2006.01)

(52) U.S. Cl.
CPC .............. *G01B 11/24* (2013.01); *G01B 15/04* (2013.01)

(58) Field of Classification Search
CPC ............ G01B 11/24; G01B 15/04; G06T 7/13
See application file for complete search history.

(56) References Cited

U.S. PATENT DOCUMENTS

2011/0252891 A1* 10/2011 Cherman ............... G01B 11/24
73/657

OTHER PUBLICATIONS

Van Der Valk, N. et al., "Terahertz polarization imaging," Optics Letters, vol. 30, No. .20, Oct. 15, 2005, pp. 2802-2804.

* cited by examiner

*Primary Examiner* — Kiho Kim
(74) *Attorney, Agent, or Firm* — Slater Matsil, LLP

(57) ABSTRACT

In an embodiment, an edge extraction method includes: emitting, toward an object, an electromagnetic wave polarized only in one direction perpendicular to a propagation direction; receiving a transmitted electromagnetic wave that has been transmitted through the object, using a receiving antenna; calculating an intensity in the propagation direction of the transmitted electromagnetic wave based on an intensity of the transmitted electromagnetic wave received by the receiving antenna; and obtaining a spatial distribution of the intensity in the propagation direction of the transmitted electromagnetic wave.

8 Claims, 18 Drawing Sheets

EDGE EXTRACTION METHOD AND EDGE EXTRACTION DEVICE

CROSS-REFERENCE TO RELATED APPLICATION

This application is a national phase entry of PCT Application No. PCT/JP2019/020102, filed on May 21, 2019, which application is hereby incorporated herein by reference.

TECHNICAL FIELD

The present invention relates to an edge extraction method and an edge extraction apparatus, and relates particularly to an edge extraction method and an edge extraction apparatus that use electromagnetic waves.

BACKGROUND

Imaging using electromagnetic waves, especially an electromagnetic wave with frequencies around 0.1 to 10 THz called a terahertz wave (THz), has high spatial resolution and permeability, and is thus expected to be applied to foreign-matter inspection and non-destructive inspection in security systems or the like. In non-destructive inspection, it is important to identify the shape of an object or content in an object (hereinafter referred to simply as an "object"). Identification of the shape of an object requires information on an outline (edge) of the object.

Conventionally, a method has been proposed that uses information regarding rotation of polarization of a terahertz wave to extract an edge of an object in imaging using a terahertz wave (NPL 1). According to NPL 1, when, in an XYZ orthogonal coordinate system, a propagation direction of a terahertz wave is a Z-direction, a terahertz wave that has only X-polarization with an electric field changing in an X-direction is made incident on an object, a Y-polarized component of a transmitted electromagnetic wave is measured, and an edge of the object is extracted from information regarding energy that rotates from X-polarization to Y-polarization.

CITATION LIST

Non Patent Literature

NPL 1: Van der Valk, Nick C J, Willemine A M van der Marel, and Paul C M Planken. "Terahertz polarization imaging." Optics letters 30.20 (2005): 2802-2804.

SUMMARY

Technical Problem

However, if an edge of an object is parallel to an X-polarization plane or a Y-polarization plane, rotation from X-polarization to Y-polarization or rotation from Y-polarization to X-polarization hardly occurs on that edge. For this reason, it is difficult to extract an edge of a plate-like body parallel to an X-polarization plane or a Y-polarization plane of an incident terahertz wave using the conventional method that only uses information regarding rotation between X-polarization and Y-polarization.

An object of embodiments of the present invention is to provide an edge extraction method and an edge extraction apparatus that make it possible to extract an edge of a plate-like body parallel to an X-polarization plane or a Y-polarization plane orthogonal to a propagation direction of an incident electromagnetic wave.

Means for Solving the Problem

To achieve the above-stated object, an edge extraction method according to embodiments of the present invention includes: a step of emitting, toward an object, an electromagnetic wave polarized only in one direction perpendicular to a propagation direction; a step of receiving a transmitted electromagnetic wave that has been transmitted through the object, using a receiving antenna; a step of calculating an intensity in the propagation direction of the transmitted electromagnetic wave based on an intensity of the transmitted electromagnetic wave received by the receiving antenna; and a step of obtaining a spatial distribution of the intensity in the propagation direction of the transmitted electromagnetic wave.

As an edge extraction method according to one embodiment of the present invention, the step of receiving the transmitted electromagnetic wave may include: a first step of receiving the transmitted electromagnetic wave using the receiving antenna that is in a first state where a polarization plane of the receiving antenna is parallel to an axis orthogonal to the propagation direction and a direction of polarization of an electromagnetic wave incident on the object, and forms a sharp angle with the propagation direction; and a second step of receiving the transmitted electromagnetic wave using the receiving antenna that is in a second state where the polarization plane of the receiving antenna is parallel to the axis orthogonal to the propagation direction and the direction of polarization of the electromagnetic wave incident on the object, and is orthogonal to the polarization plane of the receiving antenna in the first state, and the step of calculating the intensity in the propagation direction of the transmitted electromagnetic wave may include an intensity calculation step of calculating the intensity in the propagation direction of the transmitted electromagnetic wave based on a ratio between a first intensity of the transmitted electromagnetic wave received by the receiving antenna in the first state and a second intensity of the transmitted electromagnetic wave received by the receiving antenna in the second state.

As an edge extraction method according to another embodiment of the present invention, the step of emitting the electromagnetic wave may include: a step of emitting, toward the object, a first electromagnetic wave polarized only in a first direction perpendicular to the propagation direction; and a step of emitting, toward the object, a second electromagnetic wave polarized only in a second direction orthogonal to the propagation direction and the first direction, the step of receiving the transmitted electromagnetic wave may include: a step of receiving a first transmitted electromagnetic wave that is the first electromagnetic wave that has been transmitted through the object, using the receiving antenna in the first state and the receiving antenna in the second state; and a step of receiving a second transmitted electromagnetic wave that is the second electromagnetic wave that has been transmitted through the object, using the receiving antenna in the first state and the receiving antenna in the second state, and the step of calculating the intensity in the propagation direction of the transmitted electromagnetic wave may include: a first intensity calculation step of calculating the intensity in the propagation direction of the transmitted electromagnetic wave based on a ratio between a first intensity of the first transmitted electromagnetic wave received by the receiving antenna in the first state and a second intensity of the first transmitted electromagnetic wave received by the receiving antenna in the second state; and a second intensity calculation step of calculating the intensity in the propagation direction of the transmitted electromagnetic wave based on a ratio between a first intensity of the second transmitted electromagnetic wave received by the receiving antenna in the first state and a second intensity of the second transmitted electromagnetic wave received by the receiving antenna in the second state.

An edge extraction method according to another embodiment of the present invention may further include: a step of relatively rotating, around the object, a transmitting antenna for emitting, toward the object, an electromagnetic wave polarized only in one direction perpendicular to the propagation direction and the receiving antenna for receiving the transmitted electromagnetic wave, and repeating the step of emitting the electromagnetic wave toward the object and the step of receiving the transmitted electromagnetic wave, at a plurality of positions around the object; and a step of constructing an outline of the object based on intensity distributions in the propagation direction of the transmitted electromagnetic wave that are obtained based on intensities of the transmitted electromagnetic wave received at the plurality of positions.

An edge extraction apparatus according to an embodiment of the present invention includes: a transmitting antenna for emitting, toward an object, an electromagnetic wave polarized only in one direction perpendicular to a propagation direction; a receiving antenna for receiving a transmitted electromagnetic wave that has been transmitted through the object; a calculation device for calculating an intensity in the propagation direction of the transmitted electromagnetic wave based on an intensity of the transmitted electromagnetic wave received by the receiving antenna; and a processing device for obtaining a spatial distribution of the intensity in the propagation direction of the transmitted electromagnetic wave.

As an edge extraction apparatus according to an embodiment of the present invention, the receiving antenna may be configured to selectively enter a first state where a polarization plane of the receiving antenna is parallel to an axis orthogonal to the propagation direction and a direction of polarization of an electromagnetic wave incident on the object, and forms a sharp angle with the propagation direction, and a second state where the polarization plane of the receiving antenna is parallel to the axis orthogonal to the propagation direction and the direction of polarization of the electromagnetic wave incident on the object, and is orthogonal to the polarization plane of the receiving antenna in the first state, and the calculation device may include an intensity calculation unit for calculating the intensity in the propagation direction of the transmitted electromagnetic wave based on a ratio between a first intensity of the transmitted electromagnetic wave received by the receiving antenna in the first state and a second intensity of the transmitted electromagnetic wave received by the receiving antenna in the second state.

As an edge extraction apparatus according to another embodiment of the present invention, the receiving antenna may include a first receiving antenna and a second receiving antenna, the first receiving antenna may have a polarization plane that is parallel to an axis orthogonal to the propagation direction and a direction of polarization of an electromagnetic wave incident on the object and forms a sharp angle with the propagation direction, the second receiving antenna may have a polarization plane that is parallel to the axis orthogonal to the propagation direction and the direction of polarization of the electromagnetic wave incident on the object and is orthogonal to the polarization plane of the first receiving antenna, and the calculation device may include an intensity calculation unit for calculating the intensity in the propagation direction of the transmitted electromagnetic wave based on a ratio between a first intensity of the transmitted electromagnetic wave received by the first receiving antenna and a second intensity of the transmitted electromagnetic wave received by the second receiving antenna.

An edge extraction apparatus according to another embodiment of the present invention may further include: a rotation mechanism for relatively rotating the transmitting antenna and the receiving antenna around the object; and a three-dimensional shape construction device for constructing a three-dimensional shape of the object based on spatial distributions of the intensity in the propagation direction of the transmitted electromagnetic wave that are obtained based on intensities of the transmitted electromagnetic wave received at a plurality of positions around the object.

Effects of the Invention

According to embodiments of the present invention, an edge of a body parallel to a polarization plane orthogonal to a propagation direction of an incident electromagnetic wave can be extracted from a spatial distribution of the intensity in the propagation direction of the transmitted electromagnetic wave.

DESCRIPTION OF EMBODIMENTS

Hereinafter, embodiments of the present invention will be described with reference to the drawings. In the edge extraction method according to an embodiment the present invention, an electromagnetic wave that is polarized only in one direction perpendicular to a propagation direction is made incident on an object, and an edge of the object, specifically an edge parallel to a polarization plane of an incident electromagnetic wave is extracted based on electric field intensity of a component in a propagation direction of a transmitted electromagnetic wave that has been transmitted through the object. First, the edge extraction method according to an embodiment of the present invention and a simulation thereof will be described with reference to FIGS. 1 to 3D.

Figure 1:
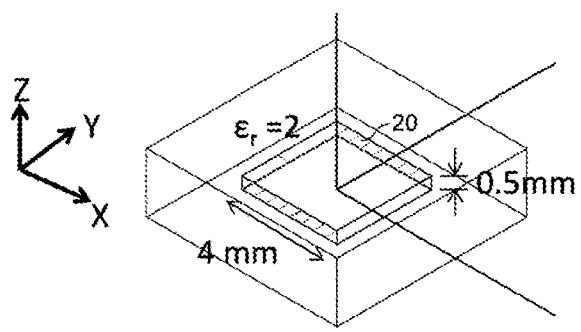
FIG. 1 is a diagram illustrating a simulation model of an edge extraction method.

FIG. 1 is a diagram illustrating a simulation model of the edge extraction method according to the present embodiment. An object 20 that is subjected to edge extraction in this simulation is a uniform plate-like member made of a material with a relative permittivity $\varepsilon_r$ of 2, with lengths of 4 mm, 4 mm, and 0.5 m in X, Y, and Z-directions, respectively, as shown in FIG. 1. This object 20 has edges that are parallel to the X and Y-directions, respectively.

Figure 2A:
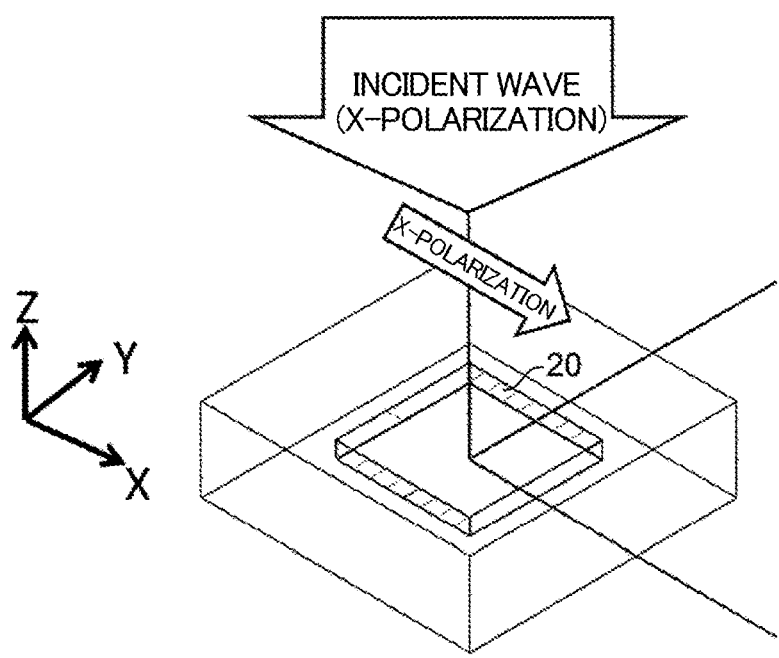
FIG. 2A is a diagram showing that an incident electromagnetic wave is an electromagnetic wave that has only X-polarization in the above simulation.

In this simulation, first, a planar wave that has only X-polarization was made incident on the plate-like object 20 that is parallel to an XY plane, as shown in FIG. 2A, and X, Y, and Z-direction components of an electric field of a transmitted electromagnetic wave that is transmitted through the object 20 were calculated. Note that, here, the frequency of the electromagnetic wave is 300 GHz, and the incident electromagnetic wave is a planar wave.

Figure 2B:
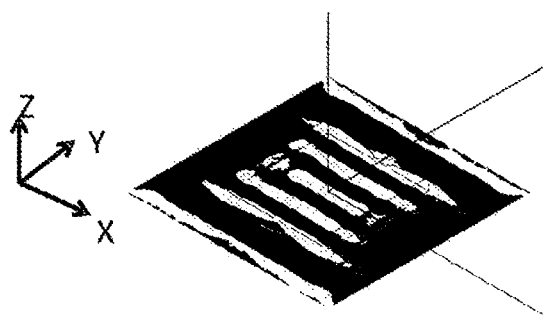
FIG. 2B is a diagram showing electric field intensity of an X-direction component of a transmitted electromagnetic wave in the case where an incident electromagnetic wave has only X-polarization, in the results of the above simulation.
Figure 2C:
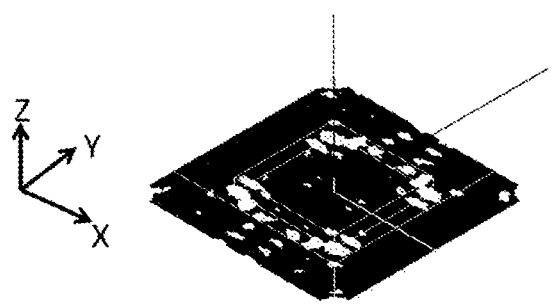
FIG. 2C is a diagram showing electric field intensity of a Y-direction component of a transmitted electromagnetic wave in the case where an incident electromagnetic wave has only X-polarization, in the results of the above simulation.
Figure 2D:
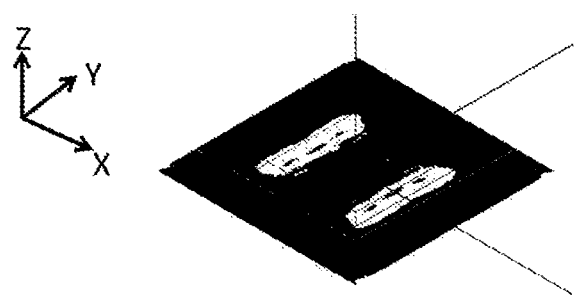
FIG. 2D is a diagram showing electric field intensity of a Z-direction component of a transmitted electromagnetic wave in the case where an incident electromagnetic wave has only X-polarization, in the results of the above simulation.

FIGS. 2B, 2C, and 2D show distributions of electric field intensity in the X, Y, and Z-directions of the transmitted electromagnetic wave in an XY plane 0.05 mm away from a bottom surface of the object 20 when an electromagnetic wave that has only X-polarization is made incident, as an incident electromagnetic wave, on the object 20.

As shown in FIGS. 2B and 2C, it can be understood that, even if an electromagnetic wave that has only X-polarization is transmitted through the object 20, the Y-direction component hardly occurs in the electric field of the transmitted electromagnetic wave, and polarization rotation from the X-direction to the Y-direction hardly occurs. This indicates that, when an edge of the object 20 is parallel to the X-polarization plane of the incident electromagnetic wave, polarization rotation from the X-direction to the Y-direction hardly occurs on the edge. For this reason, the edge of the object 20 cannot be extracted from distributions of electric field intensity in the X-direction and the Y-direction of the transmitted electromagnetic wave with respect to the incident electromagnetic wave that has only X polarization.

Meanwhile, the incident electromagnetic wave is diffracted at an edge portion of the object 20, and the transmitted electromagnetic wave thereof then has a Z-direction component. For example, as shown in FIG. 2D, it can be understood that the Z-direction component of an electric field of the transmitted electromagnetic wave with respect to the incident electromagnetic wave that has only X-polarization strongly occurs on an edge of the object 20 that is parallel to the Y axis.

Figure 3A:
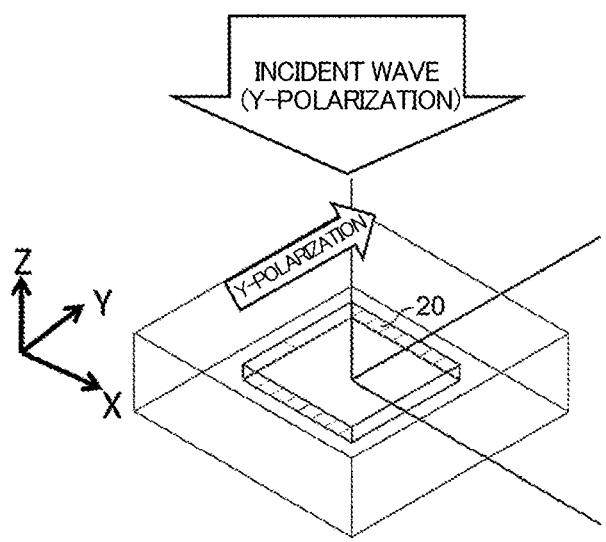
FIG. 3A is a diagram showing that an incident electromagnetic wave is an electromagnetic wave that has only Y-polarization in the above simulation.
Figure 3B:
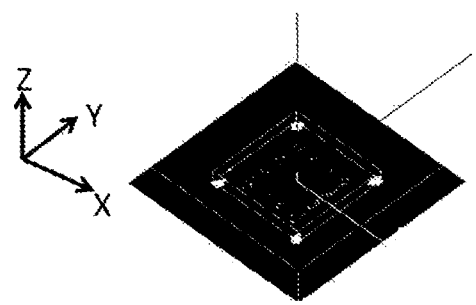
FIG. 3B is a diagram showing electric field intensity of an X-direction component of a transmitted electromagnetic wave in the case where an incident electromagnetic wave has only Y-polarization, in the results of the above simulation.
Figure 3C:
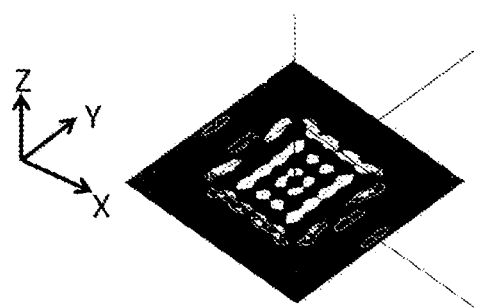
FIG. 3C is a diagram showing electric field intensity of a Y-direction component of a transmitted electromagnetic wave in the case where an incident electromagnetic wave has only Y-polarization, in the results of the above simulation.
Figure 3D:
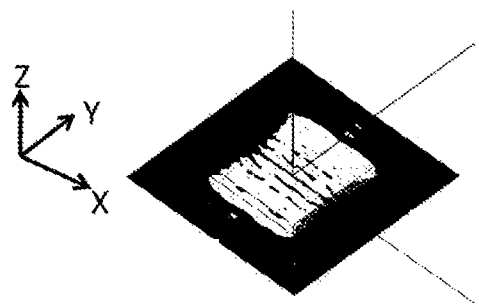
FIG. 3D is a diagram showing electric field intensity of a Z-direction component of a transmitted electromagnetic wave in the case where an incident electromagnetic wave has only Y-polarization, in the results of the above simulation.

Next, in the simulation model shown in FIG. 1, a planar wave that has only Y-polarization was made incident on the plate-like object 20 parallel to the XY plane, as shown in FIG. 3A, and X, Y, and Z-direction components of an electric field of a transmitted electromagnetic wave that is transmitted through the object 20 were calculated. Note that, here, the frequency of the electromagnetic wave is also 300 GHz, and the incident electromagnetic wave is a planar wave. FIGS. 3B, 3C, and 3D show distributions of electric field intensity in the X, Y, and Z-directions of the transmitted electromagnetic wave when an electromagnetic wave that has only Y-polarization is made incident, as an incident electromagnetic wave, on the object 20, and show distributions of the electric field intensity in the X, Y, and Z directions of the transmitted electromagnetic wave in an XY plane 0.05 mm away from a bottom surface of the object 20, similarly to FIGS. 2B, 2C, and 2D.

As shown in FIGS. 3B and 3C, it can be understood that, even if an electromagnetic wave that has only Y-polarization is transmitted through the object 20, the X-direction component hardly occurs in the electric field of the transmitted electromagnetic wave, and polarization rotation from the Y-direction to the X-direction hardly occurs. This indicates that, when an edge of the object 20 is parallel to the Y-polarization plane of the incident electromagnetic wave, polarization rotation from the Y-direction to the X-direction hardly occurs on the edge. For this reason, the edge of the object 20 cannot be extracted from distributions of electric field intensity in the X-direction and the Y-direction of the transmitted electromagnetic wave with respect to the incident electromagnetic wave that has only Y-polarization.

In contrast, as shown in FIG. 3D, it can be understood that a Z-direction component of the electric field of the transmitted electromagnetic wave with respect to the incident electromagnetic wave that has only Y-polarization strongly occurs on an edge of the object 20 that is parallel to the X-axis.

Based on the above simulation results, edges of an object that are parallel to the X-polarization plane and the Y-polarization plane can be extracted by measuring a spatial distribution of electric field intensity of a Z-direction component of an electric field of a transmitted electromagnetic wave obtained when an X-polarized electromagnetic wave and a Y-polarized electromagnetic wave are applied to a plate-like object parallel to an XY plane.

First Embodiment

Figure 4:
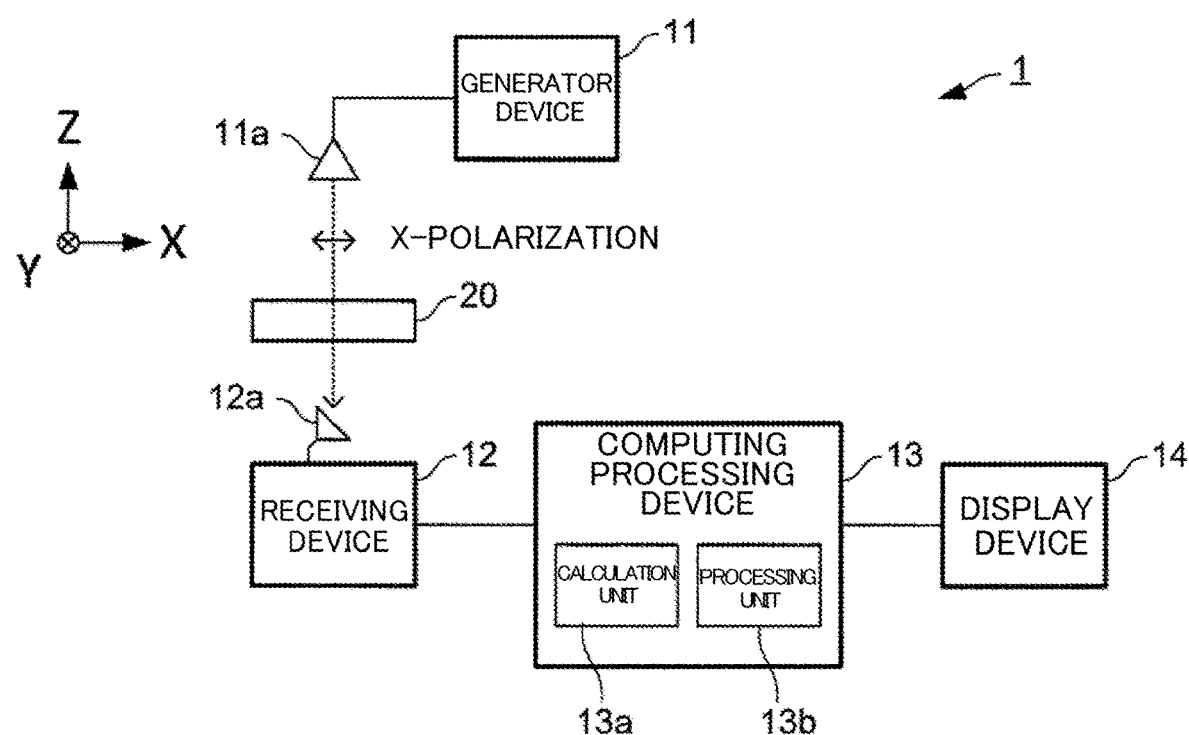
FIG. 4 is a diagram showing a configuration of an edge extraction apparatus according to a first embodiment of the present invention.

Next, an edge extraction apparatus and an edge extraction method according to an embodiment of the present invention will be described with reference to FIGS. 4 to 8. An edge extraction apparatus 1 according to the present embodiment includes a transmitting antenna 11a, a receiving device 12, a computing processing device 13, and a display device 14, as shown in FIG. 4. The transmitting antenna 11a is connected to a generator device 11 and emits, toward the object 20, an electromagnetic wave that is polarized only in one direction perpendicular to a propagation direction (Z-direction). The receiving device 12 includes a receiving antenna 12a for receiving a transmitted electromagnetic wave that has been transmitted through the transmitting antenna 11a and the object 20. The computing processing device 13 includes a calculation unit 13a for calculating an electric field intensity in the propagation direction of the transmitted electromagnetic wave (Z-direction) based on the electric field intensity of the transmitted electromagnetic wave received by the receiving antenna 12a, and a processing unit 13b for obtaining a spatial distribution of the electric field intensity in the propagation direction of the transmitted electromagnetic wave (Z-direction). The display device 14 visualizes and displays the spatial distribution of the electric field intensity in the propagation direction of the transmitted electromagnetic wave (Z-direction).

Here, the generator device 11 is a device for generating a terahertz wave. The generator device 11 may be, for example, a device that emits a laser toward a nonlinear crystal and generates a terahertz wave using an optical rectification effect in the nonlinear crystal, or a device that generates a terahertz wave by generating optical carriers in a semiconductor using an ultra-short pulse laser and modulating a photoconductive current in sub-picoseconds.

The transmitting antenna 11a is, for example, an antenna that emits, toward the object 20, a terahertz wave generated in the generator device 11 as an electromagnetic wave that is polarized only in one direction perpendicular to the propagation direction (Z-direction), e.g., the X-direction or the Y-direction. Such a transmitting antenna 11a may be, for example, a dipole antenna or the like that is formed on a dielectric substrate. The transmitting antenna 11a may also include a lens for making an electromagnetic wave to be incident on the object 20 into a planar wave that has a wavefront perpendicular to the propagation direction. The transmitting antenna 11a may also be supported so as to be able to pivot around a Z-axis such that the polarization direction can be switched between the X-direction and the Y-direction.

Figure 6:
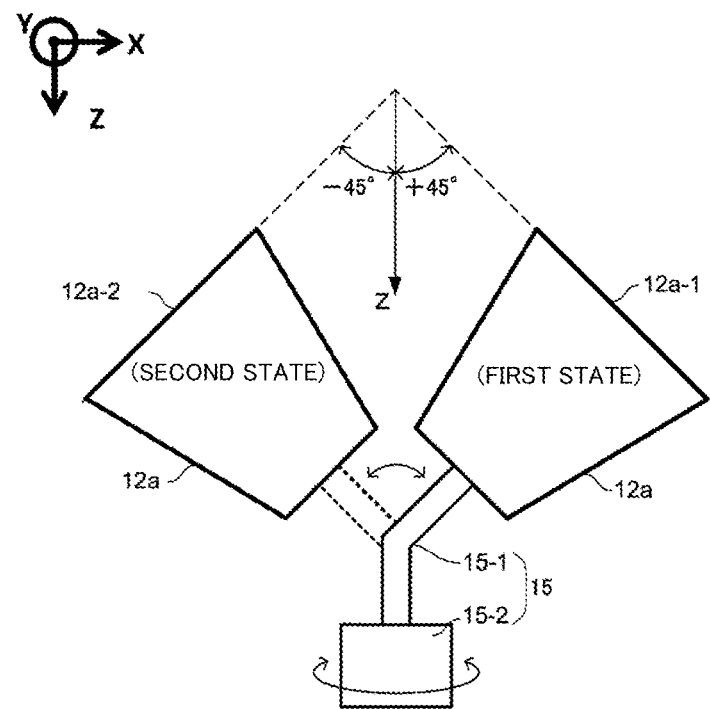
FIG. 6 is a diagram illustrating arrangement of an antenna that constitutes a receiving unit of the edge extraction apparatus according to the present embodiment.

For example, a horn antenna can be employed as the receiving antenna 12a for receiving the transmitted electromagnetic wave that has been transmitted through the object 20. To measure Z-direction components that occur as a result of a first incident electromagnetic wave that has only X-polarization and a second incident electromagnetic wave that has only Y-polarization being diffracted on an edge of the object 20, in the edge extraction apparatus 1 according to the present embodiment, the receiving antenna 12a is supported so as to be able to selectively enter a first state where a polarization plane 12a-1 of the receiving antenna 12a forms a sharp angle, e.g., +45°, with the propagation direction of the transmitted electromagnetic wave (Z-direction), and a second state where a polarization plane 12a-2 is orthogonal to the polarization plane 12a-1 of the receiving antenna in the first state, as shown in FIG. 6. This is because an electromagnetic wave is a transverse wave (vibration in the X-direction or Y-direction), while the Z-direction is the direction in which the electromagnetic wave travels.

For example, if the receiving antenna 12a is attached to a housing or the like of the receiving device 12 via a support structure 15 that includes a bent support member 15-1 and a pivoting mechanism 15-2 that pivots around a Z-axis, the polarization plane of the receiving antenna 12a can be arranged so as to form an angle of ±45° with respect to the Z-direction in an XZ plane and a YZ plane.

The receiving device 12 outputs the electric field intensity of the transmitted electromagnetic wave received by the receiving antenna 12a.

Figure 5:
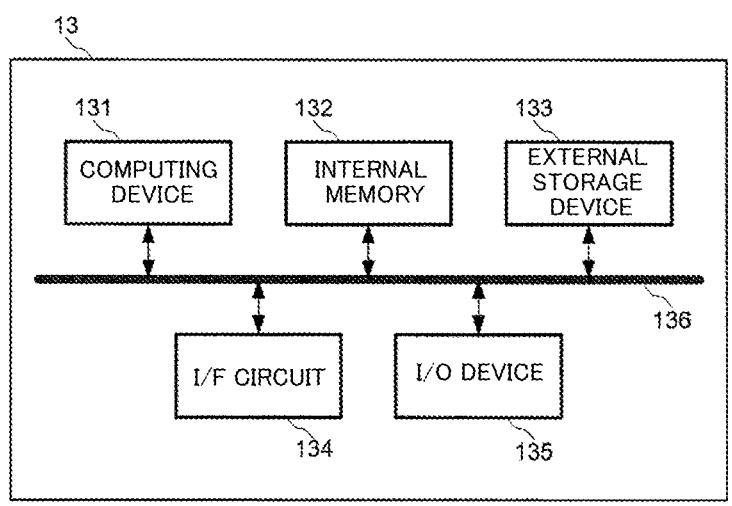
FIG. 5 is a diagram showing a hardware configuration of an information processing device of the edge extraction apparatus according to the present embodiment.

The computing processing device 13 can be constituted by a computer that includes a computing device 131, an internal memory 132, an external storage device 133, an interface (I/F) circuit 134, an input/output (I/O) device 135, and so on, which are connected to each other via a bus 136, as shown in FIG. 5. In this case, the later-described calculation unit 13a and processing unit 13b are realized as a result of hardware resources that constitute the computer cooperating with programs installed in the internal memory 132 and other storage devices.

In the edge extraction apparatus 1 according to the present embodiment, the calculation unit 13a, which is realized by the computing processing device 13, functions as a calculation device for calculating the electric field intensity of a component in the propagation direction of the transmitted electromagnetic wave received by the receiving antenna 12a, that is, the Z-direction, based on the electric field intensity of the transmitted electromagnetic wave.

The calculation unit 13a performs the following computing processing in order to measure a component in the propagation direction of the transmitted electromagnetic wave received by the receiving antenna 12a, that is, the Z-direction, based on the electric field intensity of the transmitted electromagnetic wave, that is, a component that is diffracted in the Z-direction from the incident electromagnetic wave that has only X-polarization or Y-polarization.

Figure 7A:
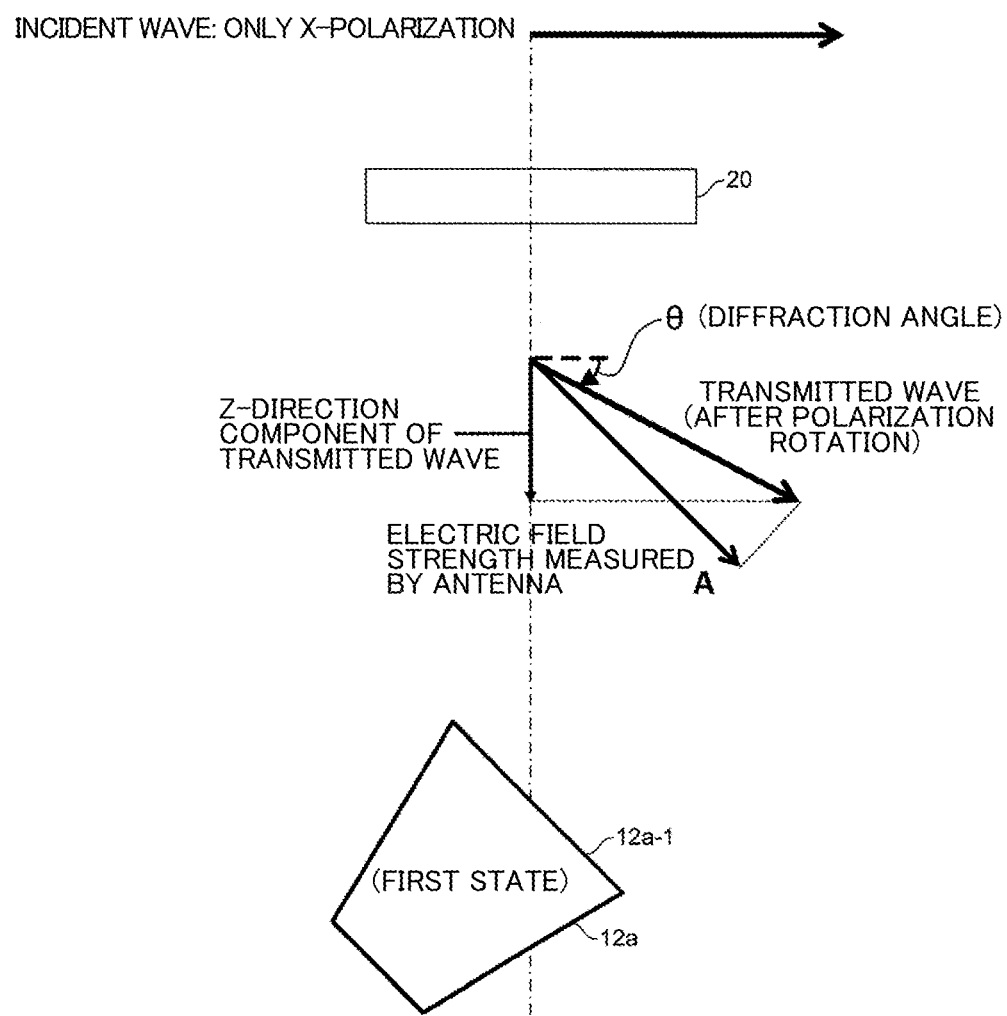
FIG. 7A is a diagram illustrating an edge extraction method according to the present embodiment.
Figure 7B:
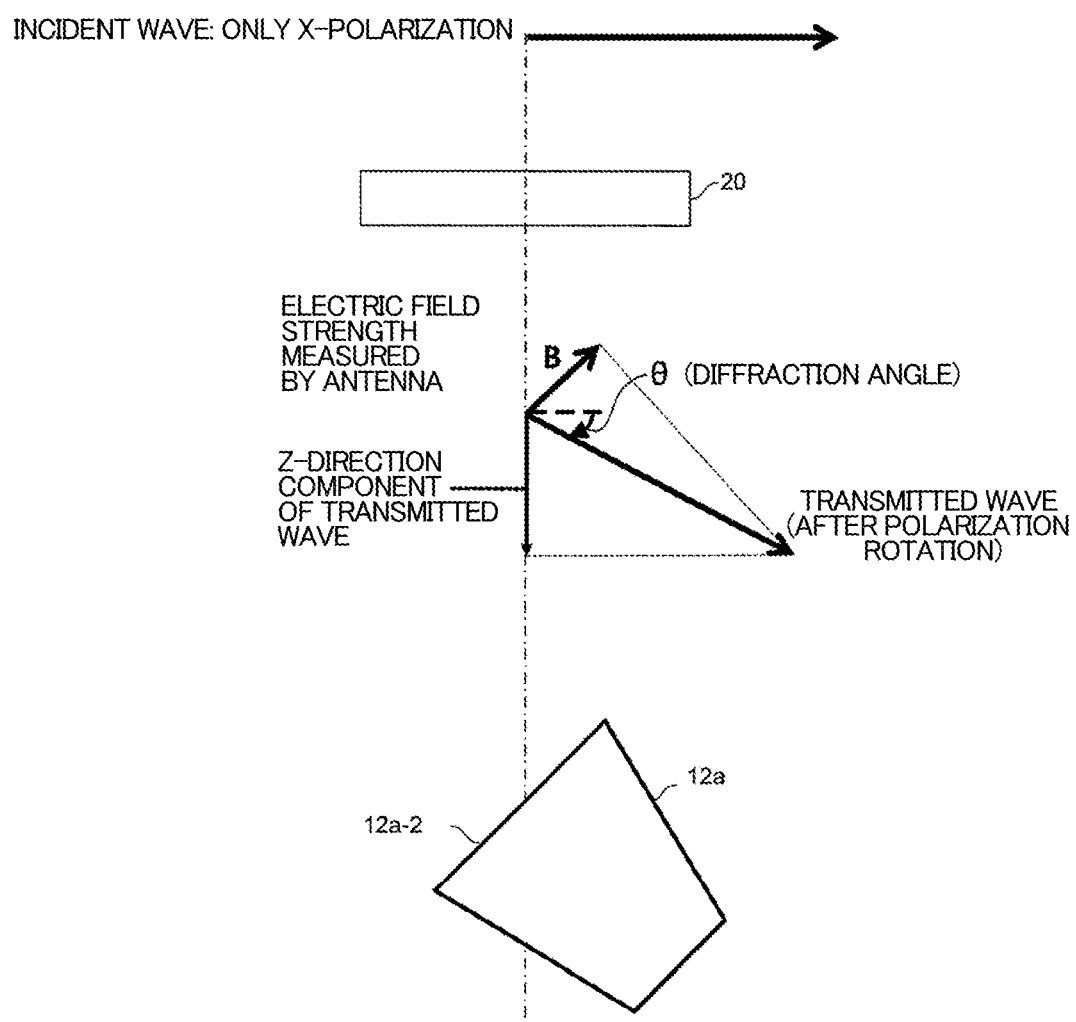
FIG. 7B is a diagram illustrating the edge extraction method according to the present embodiment.

First, consideration is given to the case of measuring a component that is diffracted in the Z-direction when the incident electromagnetic wave that has only X polarization is transmitted through the object 20. The electric field intensity is denoted as A that is measured in the first state where the polarization plane (12a-1) of the receiving antenna 12a is parallel to an axis, that is, the Y-direction, orthogonal to both the propagation direction of the incident electromagnetic wave that is incident on the object 20, that is, the Z-direction, and the direction of polarization of the incident electromagnetic wave, that is, the X-direction, and forms a sharp angle with the propagation direction (Z-direction), e.g., forms an angle of 45° with the Z-direction, as shown in FIGS. 6 and 7A. Also, the electric field intensity is denoted as B that is measured in the second direction where the polarization plane (12a-2) of the receiving antenna 12a is parallel to the Y-direction and is orthogonal to the polarization plane 12a-1 of the receiving antenna 12a in the first state (in this state, the polarization plane 12a-2 is in a state of being rotated by −45° with respect to the Z-direction), as shown in FIGS. 6 and 7B. Here, when the angle (diffraction angle) of the transmitted electromagnetic wave diffracted with respect to the incident electromagnetic wave at an edge portion of the object 20 is denoted as θ, the diffraction angle θ can be calculated using equation (1) using the electric field intensity A and the electric field intensity B that are measured by the receiving antenna 12a in the first state and the second state, respectively.

$$\theta = 45° - \arctan\left(\frac{B}{A}\right) \qquad (1)$$

Of the transmitted electromagnetic wave, a component diffracted in the Z-direction, that is, an intensity Ez in the Z-direction can be calculated based on equation (2).

$$Ez = \sqrt{A^2 + B^2} \sin\theta \qquad (2).$$

Thus, the intensity in the propagation direction (Z-direction) of the transmitted electromagnetic wave can be calculated based on a ratio between the electric field intensity A (first intensity) of the transmitted electromagnetic wave received by the receiving antenna 12a in the first state and the electric field intensity B (second intensity) of the transmitted electromagnetic wave received by the receiving antenna 12a in the second state.

Figure 8:
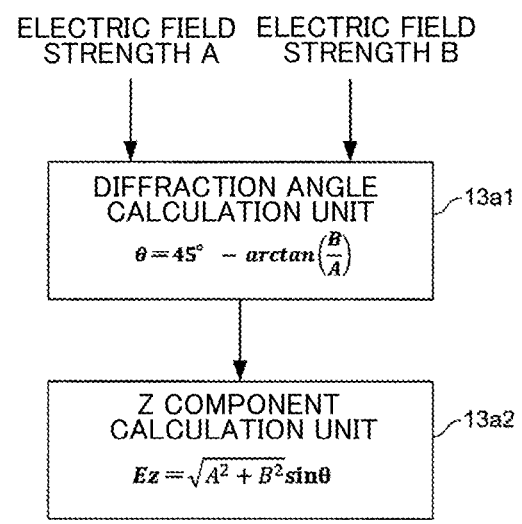
FIG. 8 is a diagram showing an example configuration of a processing unit of the edge extraction apparatus according to the present embodiment.

To perform the above computation, the calculation unit 13a of the computing processing device 13 can be constituted by a diffraction angle calculation unit 13a1 for calculating the diffraction angle θ based on the electric field intensities A and B that are measured when the receiving antenna 12a is in the first state and the second state, respectively, and a Z component calculation unit for calculating the magnitude of the Z component of the electric field of the transmitted electromagnetic wave (electric field intensity Ez in the Z direction) based on the electric field intensities A and B and the diffraction angle θ, as shown in FIG. 8.

Although the above example is in the case where an electromagnetic wave that has only X polarization is an incident electromagnetic wave, a diffraction component in the Z-direction can also be similarly measured in the case where an electromagnetic wave that has only Y polarization is an incident electromagnetic wave.

After the above-described electric field intensity Ez in the Z-direction of the transmitted electromagnetic wave is obtained for a plurality of areas in a space including the object 20, the processing unit 13b obtains a spatial distribution of the intensity Ez in the Z-direction. The results can be displayed on the display device 14.

Figure 9:
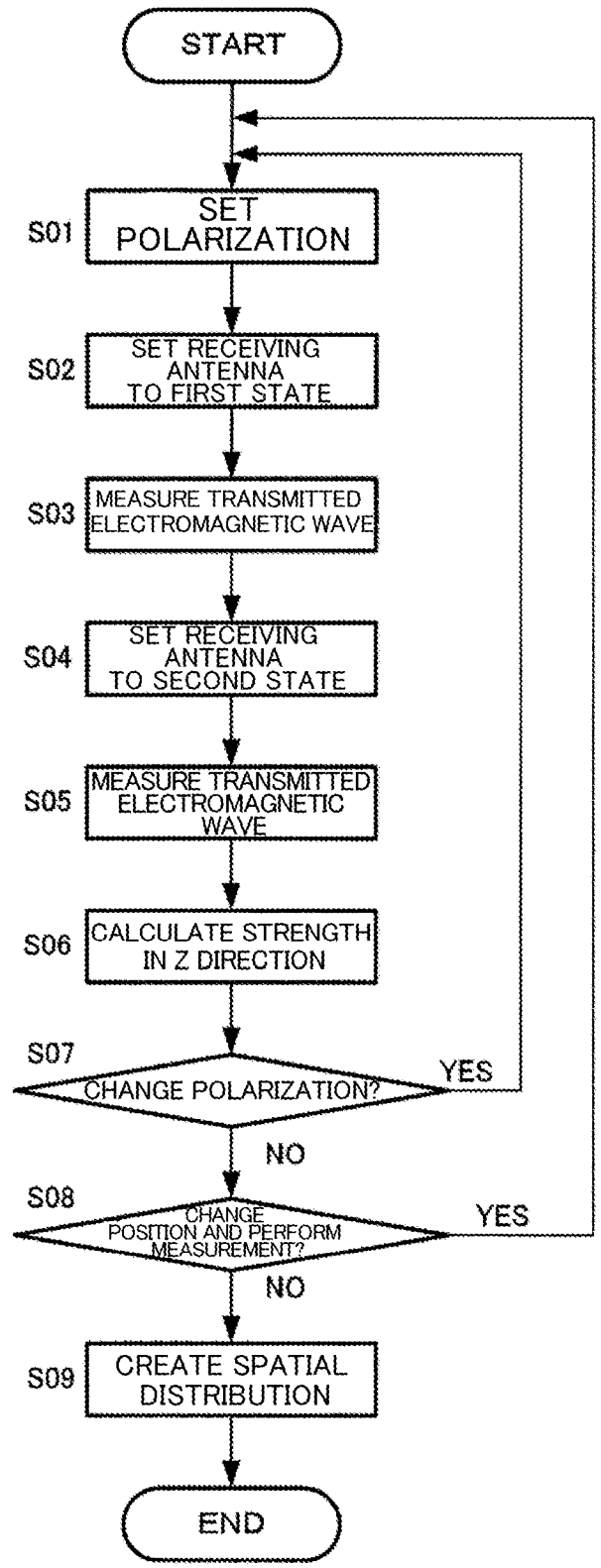
FIG. 9 is a flowchart showing a processing procedure performed in the edge extraction apparatus according to the present embodiment.

Next, a procedure for edge extraction executed by the edge extraction apparatus 1 according to the present embodiment will be described with reference to FIG. 9.

First, the orientation of the transmitting antenna 11a in the XY-direction is adjusted, and an electromagnetic wave that has only X-polarization is set as an electromagnetic wave to be applied to the object 20 (S01).

Next, the state of the receiving antenna 12a is set to the aforementioned first state (S02), and the electric field intensity A of the transmitted electromagnetic wave is measured (S03). Then, the state of the receiving antenna 12a is set to the second state (S04), and the electric field intensity B of the transmitted electromagnetic wave is measured (S05). After measuring the electric field intensity of the transmitted electromagnetic wave, the electric field intensity Ez in the Z-direction is calculated based on the electric field intensities A and B of the transmitted electromagnetic wave (S06). The calculated electric field intensity Ez is stored in the storage device in association with position information on the XY plane including the measured object 20.

Next, to perform measurement with an electromagnetic wave that has only Y-polarization (S07: YES), the polarization direction is set to Y-polarization (S01), and the above-described processing from S02 to S06 is repeated.

When the above-described processing is performed for one measurement position and then the measurement is also performed for another measurement position (S08: YES), the position is changed and the above-described processing from S01 to S07 is repeated.

After finishing the measurement using the electromagnetic wave that has only X-polarization and the electromagnetic wave that has only Y-polarization for a plurality of measurement positions in a measurement target area including the object 20 (S08: NO), a spatial distribution of the electric field intensity Ez in the Z-direction in the XY plane is created based on the electric field intensity Ez stored in the storage device (S09), and the series of processing ends. Note that the spatial distribution of the electric field intensity Ez in the Z-direction may be displayed on the display device 14.

By creating a spatial distribution of the electric field intensity Ez in the Z-direction as described above, it is possible to extract an edge of an object that is parallel to an X-polarization plane or a Y-polarization plane of an incident electromagnetic wave, which has been conventionally difficult to extract.

Second Embodiment

Next, an edge extraction apparatus according to the second embodiment of the present invention will be described.

Figure 10:
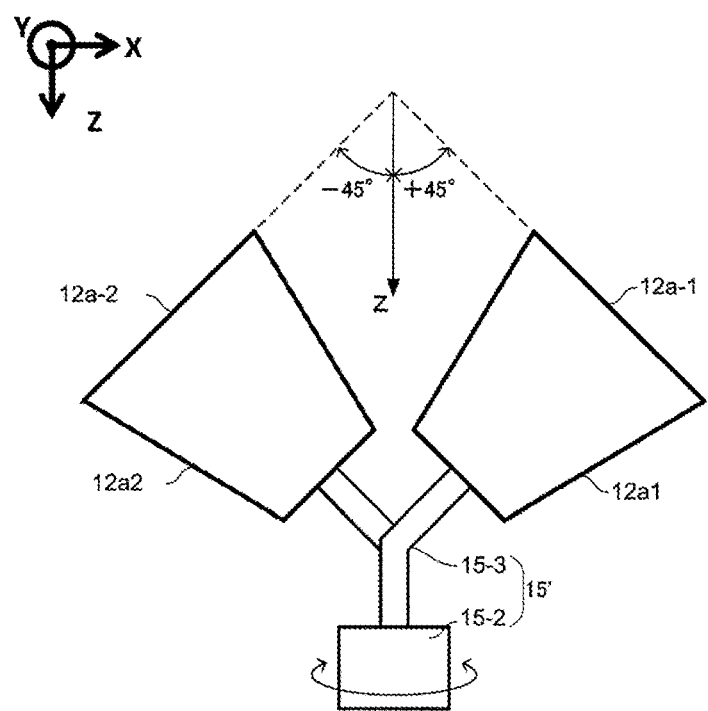
FIG. 10 is a diagram showing a main part of an edge extraction apparatus according to a second embodiment of the present invention.

The edge extraction apparatus 1 according to the above-described first embodiment performs measurement while changing the orientation of the polarization plane of one receiving antenna 12a between the first state and the second state, whereas the edge extraction apparatus according to the second embodiment differs from the first embodiment in that, two receiving antennas 12a1 and 12a2 are arranged in the first state and the second state as shown in FIG. 10, respectively, such that the electric field intensities A and B of a transmitted electromagnetic wave in the respective states can be measured simultaneously.

Due to having this configuration, measurement with an electromagnetic wave that has only X-polarization and an electromagnetic wave that has only Y-polarization can be performed at a time using the two receiving antennas 12a1 and 12a2, whereas, in the first embodiment, the measurement is performed twice using one receiving antenna 12a. Thus, more efficient measurement can be performed.

Third Embodiment

Figure 11:
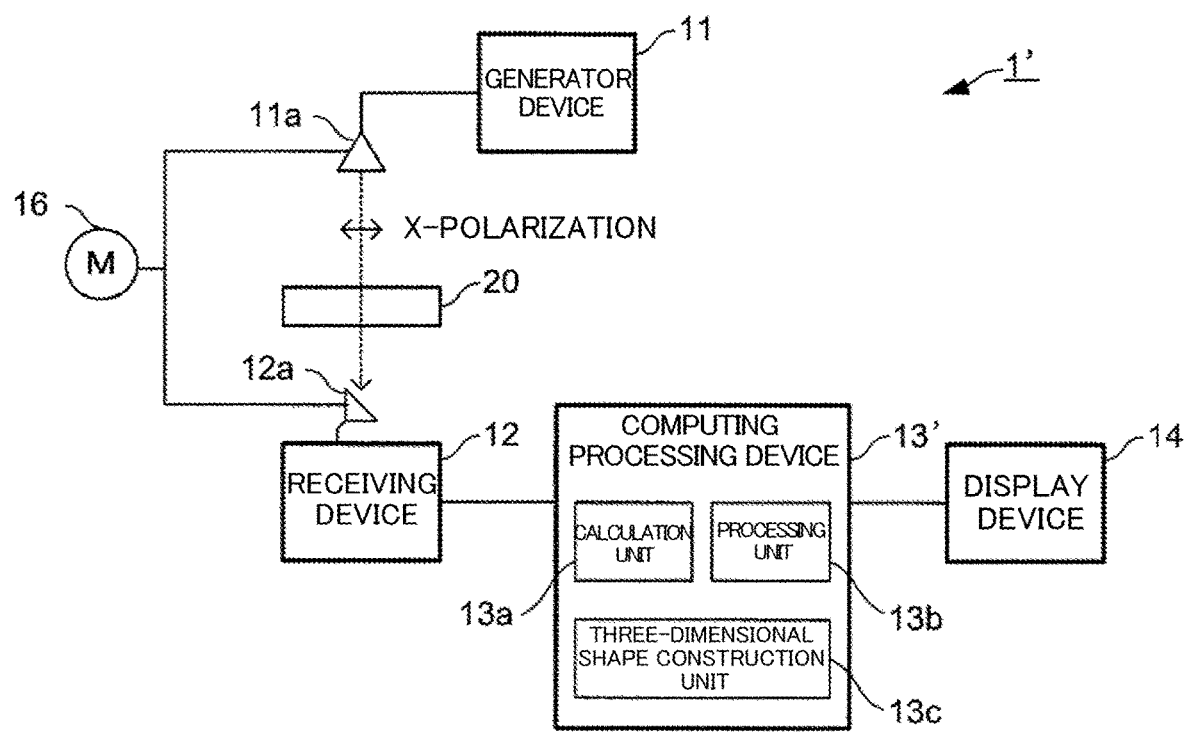
FIG. 11 is a diagram showing a configuration of an edge extraction apparatus according to a third embodiment of the present invention.

An edge extraction apparatus 1' according to the third embodiment of the present invention further includes a rotation mechanism 16 for relatively rotating the transmitting antenna 11a and the receiving antenna 12a around the object, as shown in FIG. 11. A processing device 13' of the edge extraction apparatus 1' according to the present embodiment includes a three-dimensional shape construction unit 13c for constructing a three-dimensional shape of the object 20 based on spatial distributions of the electric field intensities in the propagation direction (Z-direction) of a transmitted electromagnetic wave that are obtained based on electric field intensities of the transmitted electromagnetic wave received at a plurality of positions around the object 20.

The edge extraction apparatus 1' according to the present embodiment relatively rotates, around the object 20, the transmitting antenna 11a that emits an electromagnetic wave that is polarized only in one direction perpendicular to the propagation direction and the receiving antenna 12a for receiving a transmitted electromagnetic wave, and constructs an outline of the object 20 based on the spatial distributions of the electric field intensities in the propagation direction (Z-direction) of the transmitted electromagnetic wave that are measured at a plurality of positions around the object 20.

According to the edge extraction apparatus 1' according to the present embodiment, it is possible to extract edges of an object that are parallel to an X-polarization plane or a Y-polarization plane of an incident electromagnetic wave and construct a three-dimensional shape of the object 20.

REFERENCE SIGNS LIST 1, 1' Edge extraction apparatus
11 Generator device
11a Transmitting antenna
12 Receiving device
12a, 12a1, 12a2 Receiving antenna
13 Computing processing device
13a Calculation unit
13b Processing unit
13c Three-dimensional shape construction unit
14 Display device
15 Support structure
16 Rotation mechanism

The invention claimed is:

1. An edge extraction method comprising:
emitting, toward an object, an electromagnetic wave polarized only in one direction perpendicular to a propagation direction;
receiving a transmitted electromagnetic wave that has been transmitted through the object, using a receiving antenna;
calculating an intensity in the propagation direction of the transmitted electromagnetic wave based on an intensity of the transmitted electromagnetic wave received by the receiving antenna; and
obtaining a spatial distribution of the intensity in the propagation direction of the transmitted electromagnetic wave.

2. The edge extraction method of claim 1, wherein:
receiving the transmitted electromagnetic wave comprises:
receiving the transmitted electromagnetic wave using the receiving antenna that is in a first state where a polarization plane of the receiving antenna is parallel to an axis orthogonal to the propagation direction and a direction of polarization of an electromagnetic wave incident on the object, and forms a sharp angle with the propagation direction; and
receiving the transmitted electromagnetic wave using the receiving antenna that is in a second state where the polarization plane of the receiving antenna is parallel to the axis orthogonal to the propagation direction and the direction of polarization of the electromagnetic wave incident on the object, and is orthogonal to the polarization plane of the receiving antenna in the first state; and
calculating the intensity in the propagation direction of the transmitted electromagnetic wave comprises:
calculating the intensity in the propagation direction of the transmitted electromagnetic wave based on a ratio between a first intensity of the transmitted electromagnetic wave received by the receiving antenna in the first state and a second intensity of the transmitted electromagnetic wave received by the receiving antenna in the second state.

3. The edge extraction method of claim 2, wherein:
emitting the electromagnetic wave comprises:
emitting, toward the object, a first electromagnetic wave polarized only in a first direction perpendicular to the propagation direction; and
emitting, toward the object, a second electromagnetic wave polarized only in a second direction orthogonal to the propagation direction and the first direction;
receiving the transmitted electromagnetic wave comprises:
receiving a first transmitted electromagnetic wave that is the first electromagnetic wave that has been transmitted through the object, using the receiving antenna in the first state and the receiving antenna in the second state; and
receiving a second transmitted electromagnetic wave that is the second electromagnetic wave that has been transmitted through the object, using the receiving antenna in the first state and the receiving antenna in the second state; and
calculating the intensity in the propagation direction of the transmitted electromagnetic wave comprises:
calculating the intensity in the propagation direction of the transmitted electromagnetic wave based on a ratio between a first intensity of the first transmitted electromagnetic wave received by the receiving antenna in the first state and a second intensity of the first transmitted electromagnetic wave received by the receiving antenna in the second state; and
calculating the intensity in the propagation direction of the transmitted electromagnetic wave based on a ratio between a first intensity of the second transmitted electromagnetic wave received by the receiving antenna in the first state and a second intensity of the second transmitted electromagnetic wave received by the receiving antenna in the second state.

4. The edge extraction method of claim 1 further comprising:
relatively rotating, around the object, a transmitting antenna for emitting, toward the object, the electromagnetic wave polarized only in one direction perpendicular to the propagation direction;
repeating the emitting the electromagnetic wave toward the object;
relatively rotating, around the object, the receiving antenna for receiving the transmitted electromagnetic wave;
repeating the receiving the transmitted electromagnetic wave, at a plurality of positions around the object; and
constructing an outline of the object based on intensity distributions in the propagation direction of the transmitted electromagnetic wave that are obtained based on intensities of the transmitted electromagnetic wave received at the plurality of positions.

5. An edge extraction apparatus comprising:
a transmitting antenna configured to emit, toward an object, an electromagnetic wave polarized only in one direction perpendicular to a propagation direction;
a receiving antenna configured to receive a transmitted electromagnetic wave that has been transmitted through the object;
a calculator configured to calculate an intensity in the propagation direction of the transmitted electromagnetic wave based on an intensity of the transmitted electromagnetic wave received by the receiving antenna; and a processor configured to obtain a spatial distribution of the intensity in the propagation direction of the transmitted electromagnetic wave.

6. The edge extraction apparatus of claim 5, wherein:

the receiving antenna is further configured to selectively enter a first state and a second state, wherein in the first state a polarization plane of the receiving antenna is parallel to an axis orthogonal to the propagation direction and a direction of polarization of an electromagnetic wave incident on the object, and forms a sharp angle with the propagation direction, wherein in the second state the polarization plane of the receiving antenna is parallel to the axis orthogonal to the propagation direction and the direction of polarization of the electromagnetic wave incident on the object, and is orthogonal to the polarization plane of the receiving antenna in the first state; and the calculator is further configured to calculate the intensity in the propagation direction of the transmitted electromagnetic wave based on a ratio between a first intensity of the transmitted electromagnetic wave received by the receiving antenna in the first state and a second intensity of the transmitted electromagnetic wave received by the receiving antenna in the second state.

7. The edge extraction apparatus of claim 5, wherein:

the receiving antenna comprises a first receiving antenna and a second receiving antenna, wherein the first receiving antenna has a polarization plane that is parallel to an axis orthogonal to the propagation direction and a direction of polarization of an electromagnetic wave incident on the object and forms a sharp angle with the propagation direction, wherein the second receiving antenna has a polarization plane that is parallel to the axis orthogonal to the propagation direction and the direction of polarization of the electromagnetic wave incident on the object and is orthogonal to the polarization plane of the first receiving antenna; and the calculator is further configured to calculate the intensity in the propagation direction of the transmitted electromagnetic wave based on a ratio between a first intensity of the transmitted electromagnetic wave received by the first receiving antenna and a second intensity of the transmitted electromagnetic wave received by the second receiving antenna.

8. The edge extraction apparatus of claim 5 further comprising:

a rotation mechanism configured to relatively rotate the transmitting antenna and the receiving antenna around the object; and a three-dimensional shape constructor configured to construct a three-dimensional shape of the object based on spatial distributions of the intensity in the propagation direction of the transmitted electromagnetic wave that are obtained based on intensities of the transmitted electromagnetic wave received at a plurality of positions around the object.

* * * * *